United States Patent [19]

Abbott et al.

[11] Patent Number: 5,177,806
[45] Date of Patent: Jan. 5, 1993

[54] OPTICAL FIBER FEEDTHROUGH

[75] Inventors: Kathleen S. Abbott, Wilmington, Del.; Michael J. Hodgson, Ipswich, England; Brian M. Macdonald, Felixstowe, England; David R. Smith, Woodbridge, England

[73] Assignee: E. I. Du Pont de Nemours and Company, Wilmington, Del.

[21] Appl. No.: 814,268

[22] Filed: Dec. 24, 1991

Related U.S. Application Data

[63] Continuation of Ser. No. 455,881, Dec. 21, 1989, abandoned, which is a continuation of Ser. No. 74,791, Jul. 17, 1987, abandoned.

[30] Foreign Application Priority Data

Dec. 5, 1986 [GB] United Kingdom ............... 8629158

[51] Int. Cl.$^5$ ............................................. G02B 6/42
[52] U.S. Cl. ........................................ 385/76; 385/78; 385/88; 385/138
[58] Field of Search ............... 350/96.20, 96.21, 96.22; 385/76, 77, 78, 81, 83, 84, 86, 87, 88, 90, 92, 94, 138

[56] References Cited

U.S. PATENT DOCUMENTS

| | | |
|---|---|---|
| 2,312,579 | 3/1943 | O'Brien ............................. 13/59 |
| 2,640,901 | 6/1953 | Kinman ............................ 201/63 |
| 2,728,425 | 12/1955 | Day ............................... 189/36.5 |
| 2,992,513 | 7/1961 | Breadner ............................ 49/1 |
| 3,035,372 | 5/1962 | Mayers ............................. 49/81 |
| 3,107,757 | 10/1963 | Breadner ......................... 189/36.5 |
| 3,244,947 | 4/1966 | Slater ............................. 317/234 |
| 3,370,874 | 2/1968 | Scherer et al. ............... 287/189.365 |
| 3,427,703 | 2/1969 | Baade ............................. 29/406 |
| 3,582,324 | 6/1971 | Kunert et al. .................... 75/134 |
| 3,770,568 | 11/1973 | Graff et al. ..................... 161/193 |
| 3,837,688 | 9/1974 | Vollbehr ......................... 285/177 |
| 3,840,889 | 10/1974 | O'Brien et al. ................... 357/81 |
| 3,854,827 | 12/1974 | Merz et al. ...................... 403/29 |
| 3,861,781 | 1/1975 | Hasegawa et al. ............... 350/96 C |
| 3,932,761 | 1/1976 | Ramsey et al. .................. 250/552 |
| 4,003,074 | 1/1977 | Yonezu et al. .................... 357/74 |
| 4,029,897 | 6/1977 | Mayer et al. .................... 174/152 |
| 4,058,821 | 11/1977 | Miyoshi et al. ................... 357/19 |
| 4,119,363 | 10/1978 | Camlibel et al. ................ 350/96.20 |
| 4,128,697 | 12/1978 | Simpson ......................... 428/433 |
| 4,144,504 | 3/1979 | Leggett et al. .................... 357/74 |
| 4,158,477 | 6/1979 | Philliips et al. ................. 350/96.21 |
| 4,166,668 | 9/1979 | MacLeod ....................... 350/96.20 |
| 4,189,206 | 2/1980 | Terai et al. ..................... 350/96.20 |
| 4,223,978 | 9/1980 | Kummer et al. ................. 350/96.20 |
| 4,252,457 | 2/1981 | Benson et al. .................... 403/284 |
| 4,306,766 | 12/1981 | Karol ........................... 350/96.21 |
| 4,307,934 | 12/1981 | Palmer ........................ 350/96.20 |
| 4,338,577 | 7/1982 | Sato et al. ........................ 372/36 |
| 4,357,072 | 11/1982 | Goodfellow et al. ............ 350/96.20 |
| 4,360,965 | 11/1982 | Fujiwara ......................... 29/582 |
| 4,377,404 | 3/1983 | Hoshikawa et al. ............... 65/59.22 |
| 4,413,881 | 11/1983 | Kovats ......................... 350/96.20 |
| 4,430,376 | 2/1984 | Box ............................. 428/174 |
| 4,432,464 | 2/1984 | Seats et al. ..................... 220/2.1 A |
| 4,456,334 | 6/1984 | Henry et al. .................... 350/320 |
| 4,461,537 | 7/1984 | Raymer ........................ 350/96.20 |
| 4,482,201 | 11/1984 | Dousset ....................... 350/96.20 |
| 4,565,558 | 1/1986 | Keil et al. ......................... 65/1 |
| 4,566,892 | 1/1986 | Ertel ............................. 65/59.24 |
| 4,589,897 | 5/1986 | Mathyssek et al. ................. 65/2 |
| 4,591,711 | 5/1986 | Taumberger .................... 250/227 |
| 4,615,031 | 9/1986 | Eales et al. ...................... 372/36 |

(List continued on next page.)

FOREIGN PATENT DOCUMENTS 21473 1/1981 European Pat. Off. .

(List continued on next page.)

OTHER PUBLICATIONS

Wittke et al., "Stabilization of CW Injection Lasers", RCA Technical Notes, TN 1005, Apr. 1975, pp. 1–3.

(List continued on next page.)

*Primary Examiner*—Frank Gonzalez

[57] ABSTRACT

An optical fiber feedthrough comprising a glass seal for sealing the optical fiber within a metal sleeve. The fiber is held in a fixed position with respect to the sleeve while a glass solder, preferably an annular preform, is heated to its glass transition temperature and then cooled to form a glass to metal seal.

49 Claims, 3 Drawing Sheets

U.S. PATENT DOCUMENTS

| | | | |
|---|---|---|---|
| 4,636,647 | 1/1987 | Nishizawa | 250/551 |
| 4,675,501 | 6/1987 | Klingel | 219/121 LG |
| 4,687,290 | 8/1987 | Prussas | 350/92.20 |
| 4,699,456 | 10/1987 | Mackenzie | 350/96.20 |
| 4,707,067 | 11/1987 | Haberland et al. | 350/96.20 |
| 4,714,315 | 12/1987 | Krause | 350/96.20 |
| 4,716,082 | 12/1987 | Ahearn et al. | 428/428 |
| 4,741,589 | 5/1988 | Halder et al. | 350/96.20 |
| 4,747,659 | 5/1988 | Takahashi | 350/96.21 |
| 4,752,109 | 6/1988 | Gordon et al. | 350/96.20 |

FOREIGN PATENT DOCUMENTS

| | | |
|---|---|---|
| 0148012 | 12/1984 | European Pat. Off. . |
| 137485 | 4/1985 | European Pat. Off. . |
| 0181532 | 5/1986 | European Pat. Off. . |
| 8606472 | 11/1986 | European Pat. Off. . |
| 2450950 | 5/1975 | Fed. Rep. of Germany . |
| 2604788 | 8/1975 | Fed. Rep. of Germany . |
| 2529313 | 1/1976 | Fed. Rep. of Germany . |
| 3211792 | 11/1983 | Fed. Rep. of Germany . |
| 3431748 | 3/1986 | Fed. Rep. of Germany . |
| 3533920 | 3/1987 | Fed. Rep. of Germany . |
| 2504693 | 4/1982 | France . |
| 2584827 | 7/1985 | France . |
| 57-58369 | 6/1982 | Japan . |
| 57-58371 | 6/1982 | Japan . |
| 1541495 | 3/1979 | United Kingdom . |
| 2026194 | 1/1980 | United Kingdom . |
| 1585899 | 3/1981 | United Kingdom . |
| 2124402 | 2/1984 | United Kingdom . |
| 2125180 | 2/1984 | United Kingdom . |
| 2131971 | 6/1984 | United Kingdom . |
| 2150858 | 7/1985 | United Kingdom . |
| 2146841 | 4/1986 | United Kingdom . |
| 2184289 | 6/1987 | United Kingdom . |

OTHER PUBLICATIONS

Tashikawa et al., "Laser Diode Module for Analog Video Transmission", Review Electrical Comm. Labs, vol. 32, No. 4, 1984.

Manko, "Solders & Soldering" (N.Y., McGraw-Hill Book Co. 1964) pp. 286–289.

Lashko et al., "Brazing & Soldering of Metals" (Jerusalem: Israel Program for Scientific Trans.) 1961, pp. 401–410.

Jenny, "Soldered Ceramic-to-Metal Seals", Product Engr. vol. 18, No. 12, pp. 154–157, 1947.

Vogt, "Metalized Glass . . . Materials & Methods", vol. 25, No. 6, pp. 81–86, 1947.

Kyle, "Glass Fiber Hermetic Seals Using a $CO_2$ Laser", Applied Optics, vol. 14, No. 6, Jun. 1975, pp. 1342–1344.

Guttmann et al., "Optical Fiber Stripline Coupler" Applied Optics, vol. 14, No. 5, May 1975, pp. 1225–1227.

Norland Products Inc. Brochure, six pages "Fiber Optic Splice System", 695 Joyce Kilmer Ave., New Brunswick, N.J., 08902, (no date available).

Tachikawa & Saruwatari Article "Design and Performance of Metal-Sealed Laser-Diode Coupler for Optical Subscriber Transmission."

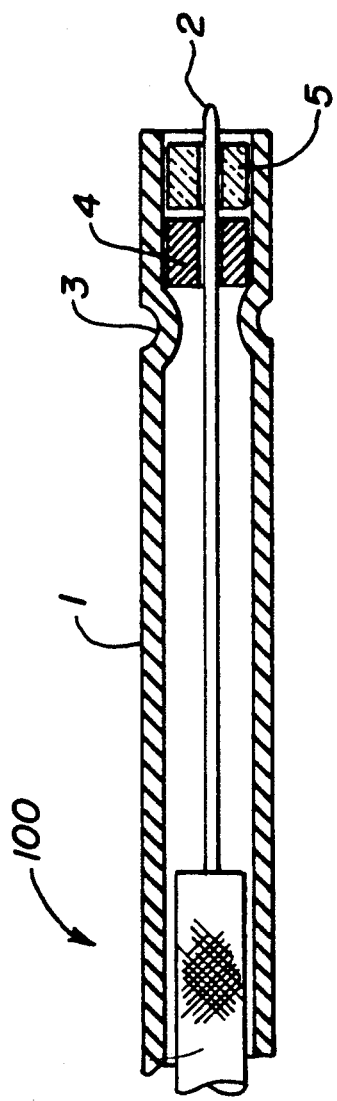
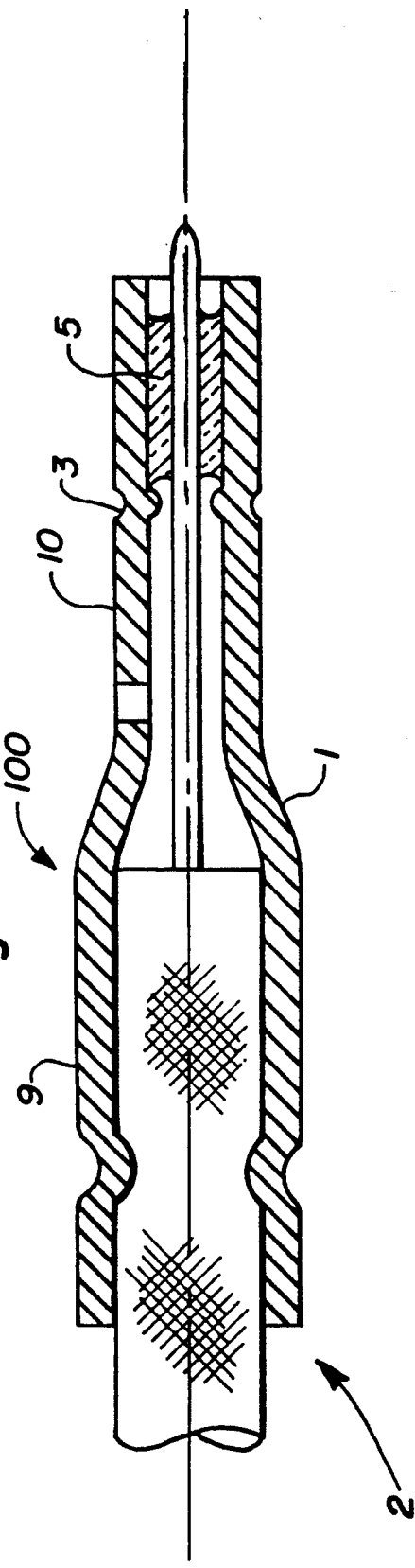

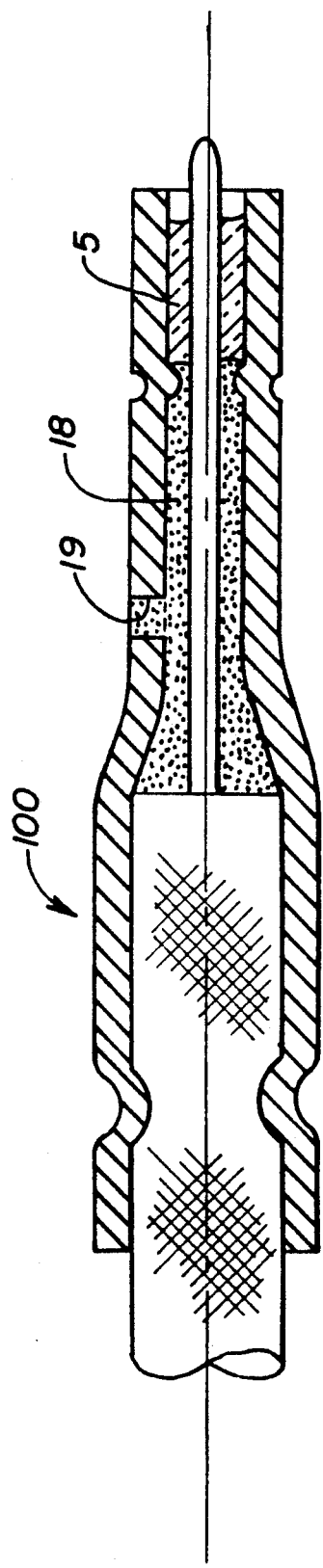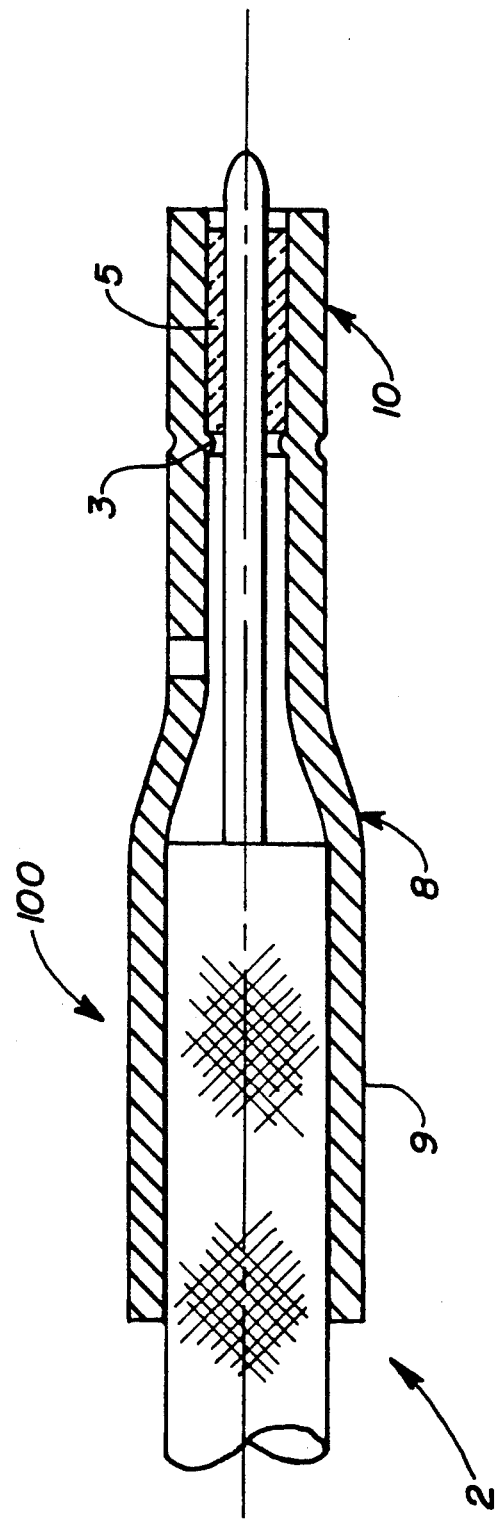

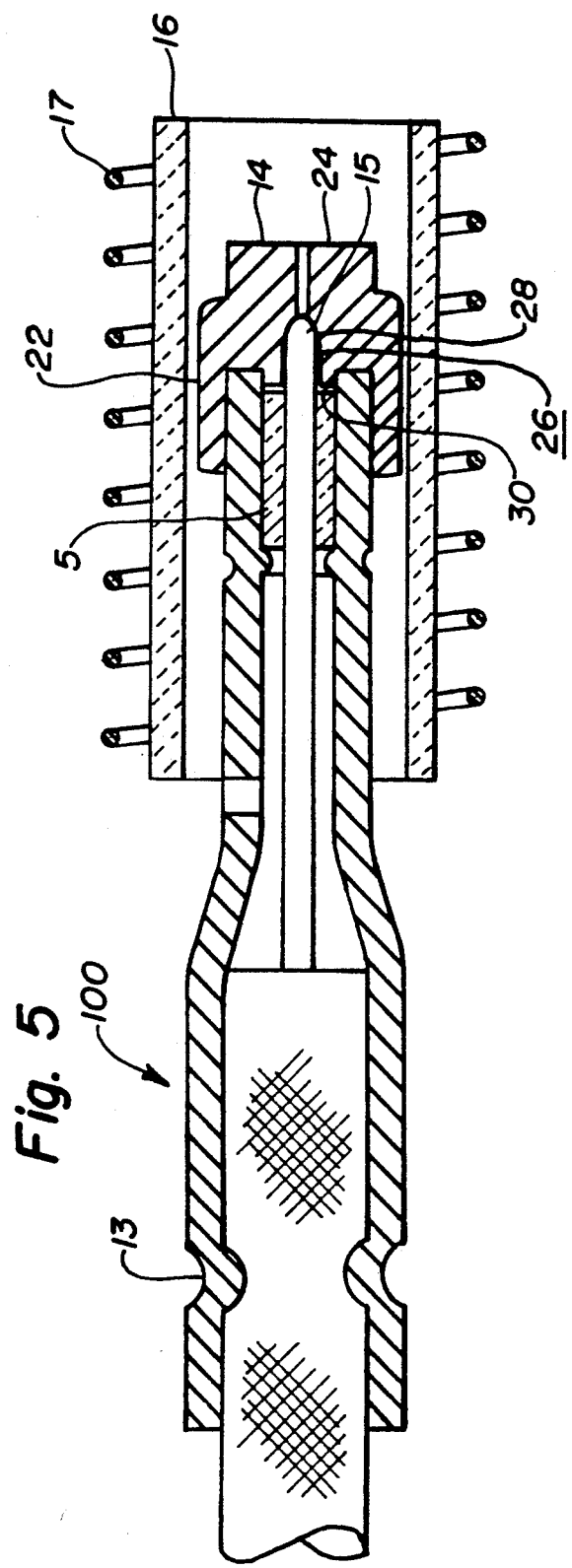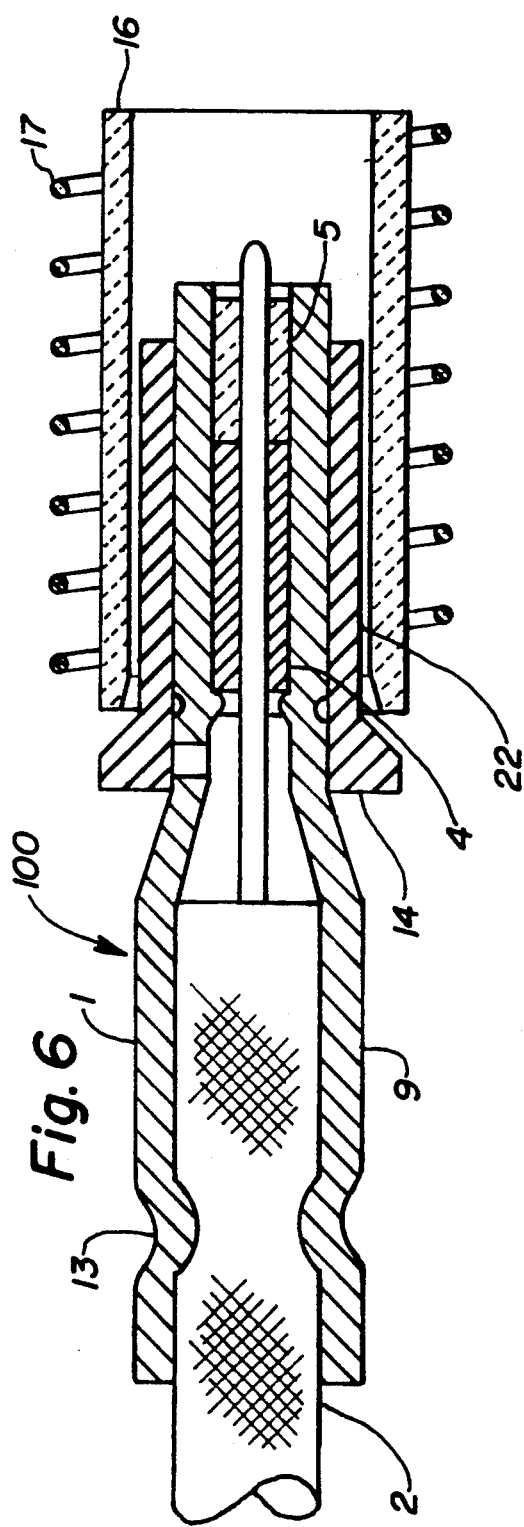

5,177,806

OPTICAL FIBER FEEDTHROUGH

This is a continuation of application Ser. No. 07/455,881 filed Dec. 21, 1989, now abandoned, which is a continuation of application Ser. No. 07/074,791 filed Jul. 17, 1987, now abandoned.

BACKGROUND OF THE INVENTION

1. Field of the Invention

This invention relates to feedthrough of optical fibers and in particular but not exclusively to feedthrough into device packages.

2. Description of the Prior Art

Device packages that incorporate an optical or opto-electronic component have an aperture for the feedthrough of the optical fibers that conduct light to or from the package. It has been usual practice to support the connecting portion of the fibers in a metal sleeve and then for the sleeve to be mounted in the aperture, the fibers being held in the sleeve by a metal solder or epoxy resin.

If a fiber is to be soldered into the sleeve it is necessary to metallize the fiber so that the metal solder will adhere to the fiber and the additional handling of the delicate fiber during the metallization process can cause damage, especially to the end of the fiber which in some instances will already have been provided with a lens. The lensing process cannot be performed easily after metallization because the proximity of a metal surface tends to interfere with the arc discharge technique generally employed. Also, metal solder is subject to creep and this can lead to loss of alignment of the fiber to the optical or opto-electronic device, and over the course of time it may even creep sufficiently to cause loss of hermetic sealing between the fiber and sleeve.

On the other hand if epoxy resin is used to hold the optical fibers in position there is a slow release of gases from the resin (even after heat treatment) and the gases that are discharged can be harmful to components within the package. A further problem that is encountered with both metal solder and epoxy resin is that the fiber may not be concentric with the sleeve and therefore the precise position of the fiber may not be known so that once the sleeve has been aligned it is necessary to perform compensating adjustments in order to ensure alignment of the optical fiber with the opto-electronic or optical component in the package.

The present invention is directed towards providing a hermetic seal between an optical fiber and a feedthrough sleeve utilizing glass solder.

SUMMARY OF THE INVENTION

Accordingly the present invention provides an optical fiber feedthrough comprising a metallic sleeve, an optical fiber in the sleeve and a glass seal between the optical fiber and the sleeve forming a fiber to glass sealing interface at the fiber surface and a glass to metal sealing interface at the inner surface of the sleeve.

The invention also provides a method of sealing optical fibers in a feedthrough comprising threading an optical fiber through a sleeve, disposing a sufficient quantity of glass solder with a lower flow temperature than the fiber in at least a portion of the sleeve and heating the glass solder so that it forms a glass to fiber sealing interface at the fiber surface and glass to metal interface at the surface of the sleeve.

Preferably the glass seal comprises a glass capillary threaded on to the fiber.

BRIEF DESCRIPTION OF THE DRAWINGS

The invention is now described by way of example with reference to the accompanying drawings in which:

FIG. 1 is a schematic cross sectional view through a first embodiment of the invention;

FIG. 2 is a schematic cross sectional view through a second embodiment of the invention;

FIG. 3 shows a modification to the embodiment of FIG. 2, and FIGS. 4 and 5 show respectively, the embodiment of FIG. 2 before and during heating.

FIG. 6 shows an alternate embodiment of a thermal conduction member.

DETAILED DESCRIPTION OF THE INVENTION

Referring to FIG. 1, a feedthrough assembly generally indicated by reference character 100 comprises an outer metallic sleeve 1 through which an optical fiber 2 of silica glass is threaded. The inner surface of the sleeve 1 is provided with at least one inward protrusion close to one end of the sleeve which constricts the sleeve and which can be formed conveniently by dimpling the sleeve 1 from the outside by pressing a point into the sleeve wall to form a deformation. In the drawing a pair of dimples 3 are illustrated. The fiber 2 is threaded through the sleeve 1 so that its termination protrudes a short distance beyond the dimpled end of the sleeve. Prior to insertion into the sleeve 1 the fiber 2 is stripped of any protective coatings and, if appropriate, the end may be formed into a lens. The sleeve 1 is then slid over the fiber 2 so that a short length of inner protective coating, for example about 3 mm, extends into the sleeve 1 at the end remote from the dimples 3. Alternatively the sleeve 1 may be placed over the fiber 2 first and slid away from the end of the fiber, the fiber then being stripped and terminated and the sleeve 1 slid back to adopt the position illustrated in the drawing.

A spacer 4 consisting of an annular member of brass, silica glass or other suitable material is threaded on to the stripped fiber 2 and abuts the dimples 3 for positive location, and adjacent to the spacer 4 a preform 5 of glass solder is also located on the fiber 2. During a subsequent heat treatment the glass solder is heated to its flow temperature so that it forms a seal between the fiber 2 and the sleeve 1. In the positions illustrated in the drawing the glass solder will also seal to the spacer 4, or at least trap the spacer. However, it is also possible to form a seal without using a spacer or with the positions of the spacer and preform reversed. In the latter case if the spacer 4 is made of a material that is not adhered to by the glass solder or if it is coated with graphite, for example, then the spacer can be removed after the heat treatment. When the preform 5 is positioned next to the dimples 3 the dimples act to locate the preform 5 and also tend to retain the glass solder to the end region of the sleeve 1 when it flows during heating. It should be understood that while in the embodiment of FIG. 1 the dimples 3 are used to locate the spacer (or the preform) alternate arrangements may be used to locate these members. Use of a spacer 4 ensures that the fiber 2 is retained in a fixed spatial arrangement within the sleeve 1 during the flow stage of the glass solder. That is to say, the spacer 4 serves to radially center the fiber 2 with respect to the inner diameter of the sleeve 1 during the flow stage of the solder. In this regard it is the position of the end of the fiber that is most important and therefore to have the spacer immediately adjacent the fiber end may be advantageous. Alternatively, or in addition, an external thermal conduction member 14 (FIG. 5) may be used as described later herein.

Various types of glass may be chosen for the glass solder. Generally it is desired to achieve flow at one of the lower temperatures possible to avoid fiber embrittlement and because there are other components (including acrylic coatings further along the fiber) that cannot withstand high temperatures. In order to minimize heat transfer along the fiber and sleeve the sleeve is preferably held in contact with a heat sink. A glass solder preform with a flow temperature (i.e., glass transition temperature $T_G$) in the range of 400° C. to 480° C. is preferred for use in the invention. Flow may be achieved at lower temperatures with some glasses but the time taken for sufficient flow becomes longer.

The heat treatment for the glass solder preferably consists of heating the sleeve 1 held in an upright position until the glass solder flows into sealing contact with the fiber and sleeve. The sleeve need not be held upright, but this is generally preferred in order to form an even seal. It is envisaged that glass solder could be introduced to the sleeve in a form other than a preform, especially when an internal spacer is used as this also forms a stop within the tube.

In a particularly preferred embodiment of the invention the spacer is replaced by an external centering jig, and the sleeve is modified to have sections of differing diameters as shown in FIGS. 2 and 3. A detailed commercial assembly procedure of a feedthrough utilizing an external centering jig is now described with reference to FIGS. 2 to 5, FIGS. 2 and 3 showing completed seals and FIGS. 4 and 5 showing the structure before and during heating.

A length of single or multi-mode fiber 2 to be used for the feedthrough is processed through several steps prior to forming the desired seal. The fiber 2 may be for example a "9/125" single mode fiber, the "9" representing the diameter in micrometers, of the pure glass core for transmitting light and the "125" representing the diameter, also in micrometers, of an adjacent cladding for reflecting the light which is transmitted through the core. This type of fiber also has an inner buffer of silicone or acrylate over the cladding layer which in turn is coated with an outer buffer of nylon or Hytrel (TradeMark) polyester elastomer. The first process step is to strip the outer and inner buffer layers to expose a bare optical fiber with its reflective cladding.

This bare optical fiber is cleaned in trichloroethylene and then placed in an electric discharge arc and pulled in a controlled fashion to form an integral lensed end. The lensed optical fiber is then cleaned with methanol and allowed to dry in the open atmosphere.

The metal sleeve 1 is formed with two inside diameters, a large diameter end 9 that is large enough to slide over the outer buffer of the optical fiber 2 and a smaller inside diameter end 10 that is formed to within twenty-five micrometers of the outside diameter of the preform 5, which is essentially a short length of capillary. The metal sleeve 1 has an annulus, or several segmented dimples 3 integrally formed on the inside of the small diameter portion of the sleeve on to which one end of the glass capillary preform 5 locates. Prior to insertion of the fiber and preform the sleeve is cleaned in trichloroethylene for several minutes, ultrasonically cleaned in soapy water at 37° C. for two minutes, rinsed in deionized water, finish cleaned in methanol and blown dry with nitrogen.

The glass preform capillary 5 is made from lead borate solder glass. The inside diameter of the capillary is formed to within twenty-five micrometers of the bare optical fiber outside diameter. The capillary is polished to remove paraffin, a residual contaminant that is deposited on the capillary during the glass sawing operation employed to cut the capillary to the desired length and is then cleaned with methanol and blown dry with nitrogen.

The absence of foreign contaminants is important in making the seal. If there are any organic materials present which could go through a phase change at elevated temperatures during sealing, such as the aforementioned paraffin, the lead present in the glass capillary material could be reduced and caused to precipitate and prevent an acceptable seal from forming.

The lensed end of the bare optical fiber is inserted into the large diameter end 9 of the metal sleeve 1 until the lens protrudes 0.020 inches from the small diameter end 10 of the sleeve. The large diameter end of the sleeve is then crimped at 13 to the outer buffer of the optical fiber by deforming the sleeve in a circumferential fashion. This fixes the axial relationship of the metal sleeve 1 and the bare optical fiber 2.

Next the glass capillary 5 is slipped over the optical fiber lens and into the metal sleeve 1 until it comes to rest on the dimples 3.

Prior to heating an axially extending positioning collar or skirt portion 22 of a thermal conduction member 14 is inserted over the reduced diameter end 10 of the fiber feedthrough assembly 100. As will be developed herein the thermal conduction member 14 serves to provide uniform heating of the glass preform 5. In addition, as may be seen from FIG. 5, the thermal conduction member 14 may be formed with a closed end 24 thereon. The inner surface 26 of the closed end 24 may be provided with a centering recess 28 which is adapted to receive the projecting lensed end of the fiber 2. An annular ring 30 projects axially from the inner surface 26 of the closed end 24 of the member 14.

The ring 30 engages the inner surface of the reduced diameter end 10 of the sleeve 1 while the skirt portion 22 surrounds the outer surface of that same end of the sleeve 1. The thermal conduction member 14 can serve to radially center the fiber with respect to the inner diameter of the metal sleeve 1. It should be understood however that the ring 30 may be omitted, in which event the skirt portion 22, engaged against the outer surface of the sleeve 1 serves to center the fiber 2 with respect to that outer surface.

FIG. 5 illustrates the optical fiber feedthrough assembly 100 as it would look during the glass capillary heating operation. The recess 28 of the closed end of the member 14 may be lubricated with a wet graphite mixture 15 to prevent the softened glass capillary from wetting to it during the heating cycle. It is then carefully slipped over the lens and on to the metal sleeve 1 in order to center the lens relative to the central axis of the metal sleeve 1, the centering bead remaining in this location until the glass capillary has cooled and hardened after the heating stage.

The centering bead is made of Kovar, which has a relatively low thermal coefficient of expansion, and when the optical fiber feedthrough assembly is heated, the sleeve expands more than the Kovar bead and results in a snug fit between the sleeve and the bead. This benefits the centering operation by reducing the effect of clearance between the centering bead and metal sleeve.

The oven is made from a ceramic tube 16 and has an electrical heating element 17 in the form of a NICH-ROME ® resistance wire.

The primary function of the thermal conduction member 14 is to transmit heat uniformly from the heating element into the reduced diameter end 10 of the assembly 100. This minimizes thermal gradients within the preform 5 occasioned by coiling of the wire and makes for more efficient heating of the preform 5.

FIG. 6 illustrates an alternate embodiment of the thermal conduction member 14 in which the closed end portion is omitted. The skirt portion 22 surrounds the outer surface of the sleeve 1, as discussed earlier. It should be readily understood that when using this embodiment of the thermal conduction member 14 the centering of the fiber 14 with respect to the sleeve 1 must be done using the spacer 4, as discussed earlier.

Preferably the assembly is heated to a temperature approximately 90° C. above the glass transition temperature of the preform for four minutes and then allowed to cool.

Different glass solders may require different heating conditions, but in general the assembly is not subjected to temperatures in excess of 600° C. because the lensed tip of the optical fiber tends to crack or break off due to fiber embrittlement.

The Kovar centering bead is then removed and cleaned for reuse, and any residual graphite left on the lensed end of the feedthrough is removed with methanol.

The feedthrough is then tested for hermeticity using helium. A seal is considered hermetic if the detected leak rate does not exceed $10^{-8}$ atmospheres cubic centimeters/second Helium, MIL SPEC 883. The feedthrough as shown in FIG. 2 is now complete. An alternate embodiment of this feedthrough, FIG. 3, would be to back-fill the empty space inside the metal sleeve using an epoxy resin 18. This resin could be injected into the metal sleeve after sealing and hermeticity testing using a small access hole 19. The purpose of adding this material would be to structurally support that portion of the bare optical fiber from the stripped end of the inner and outer buffer to the glass capillary seal.

The materials used for the metal sleeve and the glass capillary are selected such that their thermal properties, such as their coefficients of thermal expansion and their dimension, are selected such that the stresses in the glass capillary are largely compressive. A theoretical analysis may be used to evaluate several material candidates for the sleeve and the capillary at a given set of geometric parameters and the results used to indicate those combinations estimated to have tensile rather than compressive stresses. Such an analysis is given below. It is noted that there are some approximations that make the analysis a guideline rather than exact.

The seal consists of three coaxial cylinders with differing properties. The bare optical fiber is designated as region 1, the glass capillary seal region 2, and the metal sleeve region 3; the outer radius of the optical fiber (taken as equal to the inner radius of the glass capillary seal) $r_1$, the outer radius of the glass capillary seal (taken as equal to the inner radius of the metal sleeve) $r_2$, and the outer radius of the metal sleeve $r_3$.

Each region has its own set of physical properties: modulus of elasticity E, Poisson's ratio $v$, and coefficient of thermal expansion $\alpha$. Each region also has its own set of physical dimensions. The dimensions selected are typical for the intended application of the feedthrough.

TABLE I

PROPERTIES USED IN CALCULATIONS
($r_1$ = 62.5 micrometers; $r_2$ = 200 micrometers; $r_3$ = 300 micrometers)

| REGION | EXP. COEFF. (1.E-7/C) | PR | E(1.E7 PSI) | $T_G$(C) |
|---|---|---|---|---|
| 1. OPTICAL FIBER SILICA | 5 | .16 | 1.0 | |
| 2. GLASS CAPILLARY | | | | |
| "OI" ESG 1015 GLASS | 84 | .22 | 1.0 | 408 |
| "SCHOTT" 8471 GLASS | 106 | .22 | 1.0 | 332 |
| "OI" PP-100 GLASS | 115 | .22 | 1.0 | 305 |
| "OI" PP-200 GLASS | 125 | .22 | 1.0 | 290 |
| 3. METAL SLEEVE | | | | |
| KOVAR ® ALLOY METAL | 52.2 | .30 | 2.0 | |
| 52-ALLOY | 97.2 | .30 | 2.4 | |
| 1010 STEEL | 151.0 | .30 | 2.9 | |
| 304L STAINLESS STEEL | 182.0 | .30 | 2.8 | |

EXP. COEFF. = Linear thermal expansion coefficient
PR = Poisson's ratio ($v$) (value estimated)
E = Young's modulus (value estimated)
$T_G$ = Glass transition temperature
"OI" = Products available from Owens-Illinois, Inc.
"SCHOTT" = Schott Glaswerke, Marinz, Fed. Rep. of Germany
KOVAR ® = Trademark of Westinghouse Electric Corp. an alloyed metal having 17% cobalt, 29% nickel, 0.2% silica, 0.3% manganese, 0.2% carbon, remainder iron
"52-ALLOY" = a metal alloy of 51% nickel and 49% iron
"1010" = .1% carbon steel
"304L" = a weldable stainless steel, 19% chromium, 10% nickel, remainder iron The two-layer composite cylinder was analyzed by G. E. Redston and J. E. Stanworth, (J. Soc. Glass Technol., 29 [132]48-76, 1945) and the generalized multilayer cylinder was discussed by A. Varshneya, ("Treatise on Materials Science and Technology, Vol. 22, Glass III", pp. 241-306, eds. M. Tomozawa and R. H. Doremus, Academic Press, N.Y., 1982). The solution is obtained as follows:

The constitutive equations relating stress to strain for an elastic material, in polar coordinates, (S. P. Timoshenko and J. N. Goodier, Theory of Elasticity, page 444, 3d Ed. McGraw-Hill Book Co., N.Y., 1970), are:

$$\epsilon_r = \epsilon_f + E^{-1}[\sigma_r - v(\sigma_\theta + \sigma_z)] \tag{1}$$

$$\epsilon_\theta = \epsilon_f + E^{-1}[\sigma_\theta - v(\sigma_r + \sigma_z)] \tag{2}$$

$$\epsilon_z = \epsilon_f + E^{-1}[\sigma_z - v(\sigma_r + \sigma_\theta)] \tag{3}$$

where $\epsilon_r$, $\epsilon_\theta$, $\epsilon_z$ are the radial, circumferential (or hoop), and axial strains; $\sigma_r$, $\sigma_\theta$, $\sigma_z$ are the respective stresses; E is Young's modulus; $v$ is Poisson's ratio; and $\epsilon_f$ is the free strain, $$\epsilon_f = \alpha \Delta T \tag{4}$$

where $\alpha$ is the linear thermal expansion coefficient and $\Delta T$ is the temperature change (negative when cooling). The strains are defined in terms of the radial displacement, u, as $$\epsilon_r = du/dr \tag{5}$$

$$\epsilon_\theta = u/r \tag{6}$$

where r is the radial coordinate. Using equations (1)-(6) it can be shown that the stress distribution in a cylinder has the form:

$$\sigma_{rn} = A_n - B_n/r^2 \quad (7)$$

$$\sigma_{\theta n} = A_n + B_n/r^2 \quad (8)$$

$$\sigma_{zn} = C_n \quad (9)$$

where $A_n$, $B_n$, and $C_n$ are constants. A different set applies for each previously defined region: $n = 1, 2,$ and 3. The stresses must be finite at $r = 0$, so equations (7) and (8) imply that $B_1$ must be zero. This leaves eight constants to be determined using the following boundary conditions:

1) The displacements must match at the boundaries of the regions (the layers do not separate or interpenetrate), so $$u_1(r_1) = u_2(r_1) \quad (10)$$

$$u_2(r_2) = u_3(r_2) \quad (11)$$

2) The radial stresses must match at the boundaries of the regions to preserve equilibrium of forces $$\sigma_{r1}(r_1) = \sigma_{r2}(r_1) \quad (12)$$

$$\sigma_{r2}(r_2) = \sigma_{r3}(r_2) \quad (13)$$

3) There can be no net force over the end of the cylinder, since a net force would cause acceleration $$\int_0^{r_3} \sigma_z r\, dr = 0 \quad (14)$$

4) Similarly, there can be no net force normal to the lateral surface $$\sigma_{r3}(r_3) = 0 \quad (15)$$

5) The axial strains must match, since the regions cannot slide past one another $$\epsilon_{z1} = \epsilon_{z2} \quad (16)$$

$$\epsilon_{z2} = \epsilon_{z3} \quad (17)$$

These conditions provide eight equations that fix the values of the eight constants $A_n$, $B_n$, and $C_n$. The conditions can be expressed as eight simultaneous linear equations, which after selecting known values for $E_n$, $\nu_n$ and $\epsilon_{fn}$ can be solved numerically using a computer.

This analysis assumes that the materials are elastic, whereas the hot glass capillary is actually viscolastic, (G. W. Schrerer, Relaxations in Glass and Composites, John Wiley & Sons, N.Y., 1986). Therefore these results should not be regarded as exact, but as estimates (and as such are probably conservative) from which the following guidelines for material choice can be prepared, based on the physical dimensions for these members as earlier set forth.

Table II shows the stresses at the fiberglass interface for various capillary and sleeve materials.

TABLE II

CALCULATED STRESSES ($1 \times 10^3$ PSI) AT FIBER-GLASS CAPILLARY INTERFACE

| Glass | Metal | $\sigma_{r2}$ ($r_1$) | $\sigma_{\theta 2}$ ($r_1$) | $\sigma_{z2}$ ($r_1$) |
|---|---|---|---|---|
| OI ESG 1015 | KOVAR | −10.7 | 25.6 | 13.0 |
|  | 52 ALLOY | −20.7 | 13.7 | −4.9 |
|  | 1010 | −35.5 | −3.9 | −29.0 |
|  | 304L STAINLESS STEEL | −43.2 | −13.0 | −42.1 |
| SCHOTT | KOVAR | −8.7 | 28.9 | 17.4 |
|  | 52 ALLOY | −16.3 | 19.8 | 3.5 |
|  | 1010 | −27.8 | 6.3 | −15.4 |
|  | 304L STAINLESS STEEL | −34.0 | −1.1 | −26.0 |
| OI PP-100 | KOVAR | −8.1 | 29.5 | 18.5 |
|  | 52 ALLOY | −14.8 | 21.4 | 5.9 |
|  | 1010 | −25.0 | 9.2 | −11.1 |
|  | 304L STAINLESS STEEL | −30.7 | 2.4 | −20.8 |
| OI PP-200 | KOVAR | −7.7 | 31.2 | 20.3 |
|  | 52 ALLOY | −13.9 | 23.7 | 8.5 |
|  | 1010 | −23.4 | 12.4 | −7.5 |
|  | 304L STAINLESS STEEL | −28.9 | 5.9 | −16.6 |

POSITIVE VALUES INDICATE TENSION, NEGTIVE COMPRESSION, ($1 \times 10^3$ PSI)

Of the combinations listed above three pairs of glass preform and sleeve materials result in a structure in which all three stress components are in compression, viz., 1) OI ESG 1015 glass capillary and 1010 steel sleeve; 2) OI ESG 1015 glass and stainless steel sleeve; and 3) Schott glass and stainless steel sleeve. The second of the three above listed combinations is the preferred combination of materials for the physical dimensions set out in TABLE I. Stainless steel is preferred for the ease of weldability that it imparts to the structure of the feedthrough assembly.

It should be noted from foregoing that a suitable sealing interface may be defined between the sleeve and the preform whether or not the material used to form the sleeve is wettable by the glass of the preform. The 1010 sleeve is wettable by the glass. The stainless steel sleeve is not. By "sealing interface" it is meant that a hermetic seal is defined between two members having a stability leak rate of less than $10^{-8}$ atmospheres cubic centimeters/second Helium.

The equations were further used to determine the minimum guideline value of thermal expansion coefficient for the metal sleeve at the listed dimensions to yield a compressive hoop stress with OI ESG 1015, and the result was $1.30 \times 10^{-5}/°C$. This thermal expansion coefficient indicates suitability of many copper alloys as well as several stainless steel compositions.

All of the foregoing, it is emphasized, holds only for the physical dimensions above discussed. The analysis also shows that variation in the dimension of the metal sleeve may result in a given combination of sleeve and glass capillary exhibiting the desired compressive stresses. For example, Tables III and IV illustrate the results for a stainless steel sleeve and PP-100 glass when the inner radius $r_2$ and the outer radius $r_3$ of the sleeve are varied.

TABLE III

Glass PP-100
Metal Sleeve Stainless Steel
$r_1$ = 62.5 micrometers; $r_3$ = 300 micrometers

| $r_2$ (micrometers) | $\sigma_r$ | $\sigma_\theta$ | $\sigma_z$ |
|---|---|---|---|
| 125 | −36.1 | −3.5 | −26.0 |

TABLE III-continued

Glass PP-100
Metal Sleeve Stainless Steel
$r_1 = 62.5$ micrometers; $r_3 = 300$ micrometers

| $r_2$ (micrometers) | $\sigma_r$ | $\sigma_\theta$ | $\sigma_z$ |
|---|---|---|---|
| 150 | −34.3 | −1.7 | −24.6 |
| 175 | −32.6 | .3 | −22.9 |
| 200 | −30.7 | 2.4 | −20.8 |
| 225 | −28.5 | 5.0 | −18.0 |
| 250 | −25.7 | 8.3 | −14.1 |

POSITIVE VALUES INDICATE TENSION, NEGATIVE COMPRESSION, ($1 \times 10^3$ PSI)

TABLE IV $r_1 = 62.5$ micrometers; $r_3 = 400$ micrometers

| $r_2$ (micrometers) | $\sigma_r$ | $\sigma_\theta$ | $\sigma_z$ |
|---|---|---|---|
| 125 | −37.2 | −5.0 | −27.2 |
| 150 | −36.0 | −3.6 | −26.4 |
| 175 | −34.9 | −2.4 | −25.5 |
| 200 | −33.9 | −1.2 | −24.5 |
| 225 | −32.8 | .1 | −23.4 |
| 250 | −31.5 | 1.5 | −22.0 |

POSITIVE VALUES INDICATE TENSION, NEGATIVE COMPRESSION, ($1 \times 10^3$ PSI)

As is seen from TABLE III by decreasing $r_2$ from 200 micrometers to 175 micrometers the tensile hoop stress $\sigma_\theta$ decreases (from 2400 PSI to 300 PSI). The benefit of this is twofold: 1) Tensile stresses which influence the susceptibility of the glass capillary to the formation and subsequent propagation of cracks are significantly eliminated; 2) The process temperature (90° C. plus glass transition temperature $T_G$) is reduced from 498° C. for ESG 1015 glass to 395° C. for PP100 (See TABLE I) which reduces the tendency of fiber embrittlement at elevated temperature. Due to the approximations which make the analysis a guideline rather than exact, as used herein the term "largely compressive" when relating to residual stresses should be construed to include those stresses that appear in the Tables as slightly tensile. For example as may be seen with reference to TABLE III for $r_2$ equal to 175 micrometers $\sigma_\theta$ is shown as slightly tensile (300 PSI stress) yet an acceptable seal is produced. Further, as may be seen with reference to TABLE IV when $r_2$ equals 225 micrometers $\sigma_\theta$ is shown as slightly tensile (100 PSI stress) yet an acceptable seal may be produced. As a result, in accordance with the present invention a seal is provided in which the susceptibility of crack propagation is limited. The same physical mechanism is believed to also prevent the formation of cracks. It is noted that the presence of gold plating on the metal sleeve may slightly increase process temperature.

The major benefit of having the glass capillary totally in compression is that the formation of seal cracks due to tensile stresses is minimized. This eliminates the need to concern oneself with predicting the propagation rate of glass cracks, regardless of whether they are axial, circumferential or radial, in this type of application. The result is an optical fiber feedthrough of rigid construction having excellent long term hermetic properties.

We claim:

1. An optical fiber feedthrough for feeding a fiber through a wall of a package, the feedthrough comprising a metallic sleeve, an optical fiber in the sleeve and a glass seal between the optical fiber and the sleeve forming a fiber to glass sealing interface at the fiber surface and a glass to metal sealing interface at the inner surface of the sleeve, the sleeve and the fiber each having an end, the end of the fiber protruding past the end of the sleeve, the exterior of the sleeve being able to be mounted to a wall of a package such that the sleeve and the fiber pass therethrough.

2. An optical fiber feedthrough according to claim 1 in which the glass seal comprises a glass capillary member having a bore through which the optical fiber is threaded.

3. An optical fiber feedthrough according to claims 1 or 2 incorporating an internal spacer for maintaining a fixed spatial relationship between the fiber and the sleeve.

4. An optical fiber feedthrough according to claims 1 or 2 in which the fiber has a lensed end and is concentrically disposed within the metallic sleeve.

5. An optical fiber feedthrough according to claim 3 in which the fiber has a lensed end and is concentrically disposed within the metallic sleeve.

6. An optical fiber feedthrough according to claims 1 or 2 in which the metal sleeve having a coefficient of thermal expansion of at least $12 \times 10^{-6}$ per ° C.

7. An optical fiber feedthrough according to claim 4 in which the metal sleeve has a coefficient of thermal expansion of at least $12 \times 10^{-6}$ per °C.

8. An optical fiber feedthrough according to claim 3 in which the metal sleeve has a coefficient of thermal expansion of at least $12 \times 10^{-6}$ per °C.

9. An optical fiber feedthrough according to claim 5 in which the metal sleeve has a coefficient of thermal expansion of at least $12 \times 10^{-6}$ per °C.

10. An optical fiber feedthrough according to claims 1 or 2 in which the fiber comprises silica.

11. An optical fiber feedthrough according to claim 3 in which the fiber comprises silica.

12. An optical fiber feedthrough according to claim 4 in which the fiber comprises silica.

13. An optical fiber feedthrough according to claim 5 in which the fiber comprises silica.

14. An optical fiber feedthrough according to claim 7 in which the fiber comprises silica.

15. An optical fiber feedthrough according to claim 8 in which the fiber comprises silica.

16. An optical fiber feedthrough according to claim 9 in which the fiber comprises silica.

17. An optical fiber feedthrough according to claim 10 in which the fiber comprises silica.

18. An optical fiber feedthrough according to any of claims 1 to 2 in which the fiber comprises fluoride.

19. An optical fiber feedthrough according to claim 3 in which the fiber comprises fluoride.

20. An optical fiber feedthrough according to claim 4 in which the fiber comprises fluoride.

21. An optical fiber feedthrough according to claim 5 in which the fiber comprises fluoride.

22. An optical fiber feedthrough according to claim 6 in which the fiber comprises fluoride.

23. An optical fiber feedthrough according to claim 7 in which the fiber comprises fluoride.

24. An optical fiber feedthrough according to claim 8 in which the fiber comprises fluoride.

25. An optical fiber feedthrough according to claim 9 in which the fiber comprises fluoride.

26. An optical fiber feedthrough comprising a metallic sleeve, an optical fiber in the sleeve and a glass seal between the optical fiber and the sleeve forming a fiber to glass sealing interface at the fiber surface and a glass to metal sealing interface at the inner surface of the sleeve, the glass seal comprising a glass capillary member having a bore through which the optical fiber is threaded, the materials and the dimensions of the glass capillary and metallic sleeve being selected to have predetermined thermal expansion properties such that after heating to a predetermined temperature and then cooling to form the sealing interfaces any residual stresses in the glass capillary member in the radial, circumferential and axial directions are largely compressive, thereby to limit the susceptibility of the glass capillary to the propagation of cracks.

27. An optical fiber feedthrough according to claim 26 incorporating an internal spacer for maintaining a fixed spatial relationship between the fiber and the sleeve.

28. An optical fiber feedthrough according to claim 26 in which the fiber has a lensed end and is concentrically disposed within the metallic sleeve.

29. An optical fiber feedthrough according to claim 27 in which the fiber has a lensed end and is concentrically disposed within the metallic sleeve.

30. An optical fiber feedthrough according to claim 26 in which the metal sleeve has a coefficient of thermal expansion of at least $12 \times 10^{-6}$ per °C.

31. An optical fiber feedthrough according to claim 28 in which the metal sleeve has a coefficient of thermal expansion of at least $12 \times 10^{-6}$ per °C.

32. An optical fiber feedthrough according to claim 27 in which the metal sleeve has a coefficient of thermal expansion of at least $12 \times 10^{-6}$ per °C.

33. An optical fiber feedthrough according to claim 29 in which the metal sleeve has a coefficient of thermal expansion of at least $12 \times 10^{-6}$ per °C.

34. An optical fiber feedthrough according to claim 26 in which the fiber comprises silica.

35. An optical fiber feedthrough according to claim 27 in which the fiber comprises silica.

36. An optical fiber feedthrough according claim 28 in which the fiber comprises silica.

37. An optical fiber feedthrough according to claim 29 in which the fiber comprises silica.

38. An optical fiber feedthrough according to claim 30 in which the fiber comprises silica.

39. An optical fiber feedthrough according to claim 31 in which the fiber comprises silica.

40. An optical fiber feedthrough according to claim 32 in which the fiber comprises silica.

41. An optical fiber feedthrough according to claim 33 in which the fiber comprises silica.

42. An optical fiber feedthrough according to claim 26 in which the fiber comprises fluoride.

43. An optical fiber feedthrough according to claim 27 in which the fiber comprises fluoride.

44. An optical fiber feedthrough according claim 28 in which the fiber comprises fluoride.

45. An optical fiber feedthrough according to claim 29 in which the fiber comprises fluoride.

46. An optical fiber feedthrough according to claim 30 in which the fiber comprises fluoride.

47. An optical fiber feedthrough according to claim 31 in which the fiber comprises fluoride.

48. An optical fiber feedthrough according to claim 32 in which the fiber comprises fluoride.

49. An optical fiber feedthrough according to claim 33 in which the fiber comprises fluoride.

* * * * *